United States Patent [19]

Shelley

[11] 3,930,916

[45] Jan. 6, 1976

[54] HEAT RESISTANT PANELS

[75] Inventor: Stanley John Shelley, Dewsbury, England

[73] Assignee: Zirconal Processes Limited, Bromley, England

[22] Filed: June 18, 1974

[21] Appl. No.: 480,504

[30] Foreign Application Priority Data
June 28, 1973 United Kingdom............. 30736/73

[52] U.S. Cl. .................. 156/71; 52/506; 110/1 A; 156/254; 156/265; 264/30; 428/902; 428/920
[51] Int. Cl.²............................................ C04B 43/02
[58] Field of Search ...... 52/410, 506, 513; 110/1 A, 110/1 B; 156/72, 80, 254, 265, 296, 512, 71; 161/402, 403; 428/224, 902, 910, 920; 264/30

[56] References Cited
UNITED STATES PATENTS

| | | | |
|---|---|---|---|
| 1,693,015 | 11/1928 | Babor et al.......................... | 110/1 B |
| 2,379,155 | 6/1945 | Huff................................... | 110/1 A |
| 2,389,622 | 11/1945 | Hensel................................ | 110/1 A |
| 2,792,051 | 5/1957 | Jacquet............................... | 156/72 X |
| 2,853,394 | 9/1958 | Riddell et al. .................... | 161/162 X |
| 3,687,093 | 8/1972 | Byrd, Jr. ........................... | 52/506 X |
| 3,819,468 | 6/1974 | Sauder et al....................... | 156/71 X |
| 3,830,892 | 8/1974 | Wada................................. | 161/162 X |
| 3,832,815 | 9/1974 | Balaz et al. ....................... | 110/1 A X |

FOREIGN PATENTS OR APPLICATIONS
1,302,462    1/1972    United Kingdom

Primary Examiner—George F. Lesmes
Assistant Examiner—Henry F. Epstein
Attorney, Agent, or Firm—Kemon, Palmer & Estabrook

[57] ABSTRACT

Linings for furnaces or ovens are made by cutting a sheet of refractory fibrous material having fibers extending longitudinally parallel therein into strips that extend laterally, then turning the strips through 90° so the fibers are end-on, compressing the fiber end-on strips together to form a hot-face surface and attaching the strips at their base to a support.

3 Claims, 11 Drawing Figures

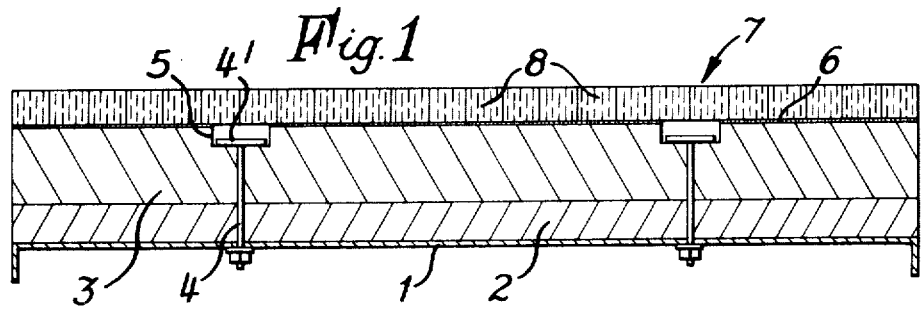
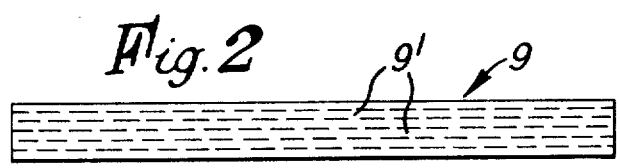
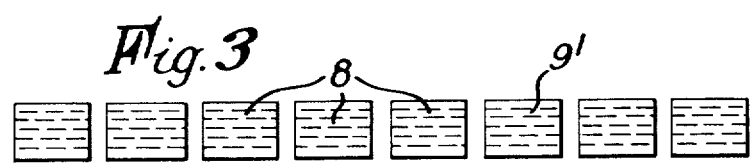
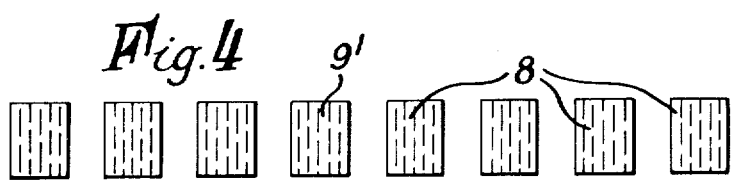
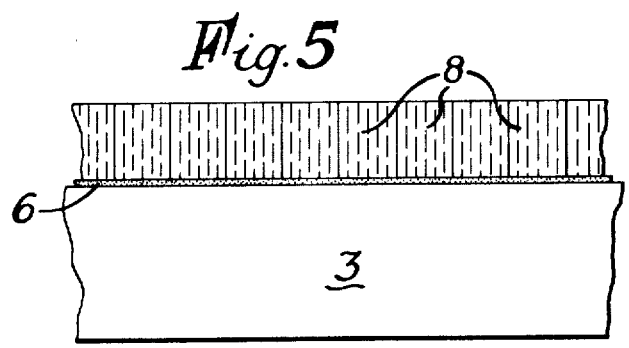

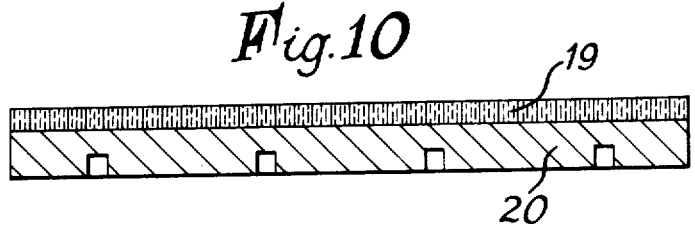
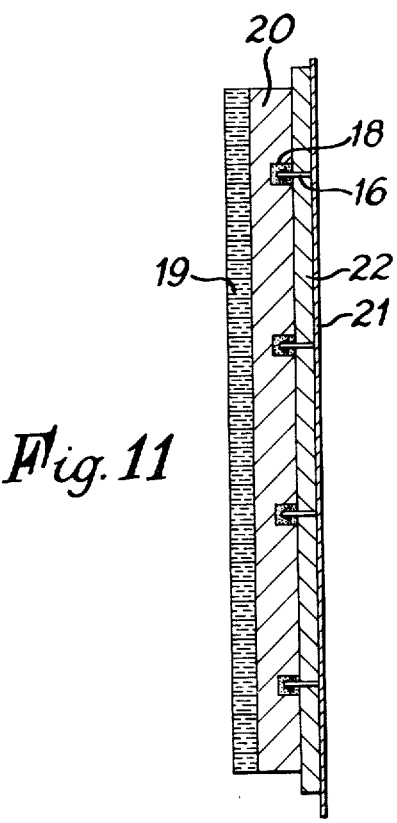

HEAT RESISTANT PANELS

This invention relates to linings for furnaces, ovens and similar enclosures.

According to the invention there is provided a lining element for constituting an inside surface or hot face for a furnace or oven, such lining element comprising refractory fibres oriented so that a substantial proportion of the fibres are end on to the surface supporting the fibres. The invention also provides means of anchoring individual fibres to the surface supporting the fibres and/or to adjacent fibres.

The preferred method of making a lining element in accordance with the invention is to cut into laterally extending strips a sheet of refractory fibrous material having fibres extending longitudinally parallel to the flat plane of the sheet. The strips are then turned through 90° and attached end on to a backing of unhardened refractory cement.

A further possibility is electro-static deposition of the fibres onto a surface which has been coated with an unhardened refractory cement. The action of the electro-static field causes mutual repulsion between the fibres. Hence they are deposited end-on to the collecting surface.

Suitable refractory cements comprise refractory powders such as sillimanite, fused mullite, fused alumina and Molochite dispersed in a thickened binder comprising a silica alcosol thickened with an evenly dispersed natural or synthetic clay. A suitable natural clay is Hectorite and suitable synthetic clays are sold under the trade name Laponite. For further details of these clays reference is made to the text book by R. E. Grimm published by McGraw Hill in 1953 and to the text book by W. E. Worrel published by McLaren in 1972.

The invention will now be described by way of example and with reference to the accompanying drawings wherein:

FIG. 1 is a section through a first high temperature insulating panel in accordance with the invention.

FIGS. 2 to 5 are diagrammatic views illustrating how the hot face of the panel of FIG. 1 is constructed.

Figure 6:
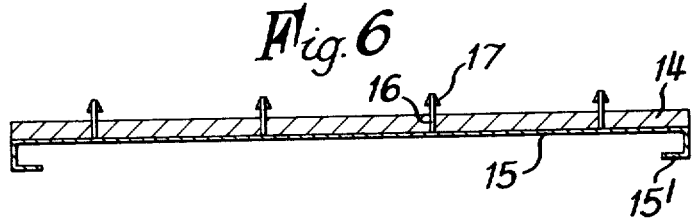
FIGS. 6 to 9 are diagrammatic views illustrating the construction of a second panel; and, FIGS. 10 and 11 are diagrammatic views illustrating the construction of a third panel.

Referring initially to FIG. 1 the panel illustrated includes a rigid steel sheet 1, a layer 2 of "Stillite Therbloc" mineral wool and a layer 3 of vermiculite block. These two layers 2 and 3 are bolted to the steel sheet 1 by heat-resistant bolts 4 having heads 4' seating in recesses 5 in the layer 3. Cemented to the layer 3 by a film 6 of refractory cements is the hot-face 7 of refractory fibre. The cement is made as follows:

300 ml of Nalfloc N1030 silica sol is diluted with 200 ml of deionised water and to the diluted silica aquasol are added 1. 25 grammes of laponite SP synthetic clay
2. 250 grammes of sillimanite grade C200
3. 1,000 grammes of sillimanite grade CML 100

The powders are added individually with stirring in the order given. A thin slip is first obtained, thickening considerably on standing for 24 hours to provide the cement.

The hot-face 7 of refractory fibre is formed from strips 8 (seen end on in FIG. 1) of ceramic fibre blanket (Triton Kaowool ceramic fibre blanket, one inch thickness and 8lb cu. ft. density is convenient) of the required dimensions joined edgewise to the vermiculite layer 3 through cement film 6. The strips 8 of ceramic fibre blanket are at least partially impregnated with a silica aquasol, a silica alcosol or an acid hydrolysate of an alkyl silicate, as described in U.K. Patent Specification No. 1,302,462. On heating this makes the strips of ceramic fibre rigid and fixes the desired orientation of the fibre. Alternatively, the strips 8 of ceramic fibre may be made partially or wholly rigid with an alumina gel binder.

FIGS. 2 – 5 illustrate the forming of the hot face 7 of refractory fibre in more detail. FIG. 2 shows an uncut blanket 9 having fibres 9' extending longitudinally generally parallel to the plane of the blanket. Laterally extending cuts divide the blanket 9 into strips 8, as shown in FIG. 3. Each strip 8 is turned about its long axis through an angle of 90°, as shown in FIG. 4. The orientation of the fibres 9' end-on then endon to the panel. The strips 8 are now at least partially impregnated with either a silica aquasol, or a silica alcosol, or an acid hydrolysate of an alkyl silicate. The impregnated strips 8 are now placed on the cement film 6 applied to the vermiculite layer 3 as shown in diagram 5, to give the hot face 7 of the insulating panel. Alternatively, the strips 8 may be made rigid with an alumina gel binder. Impregnation of the strips 8 of ceramic fibre blanket to confer rigidity is not essential. If desired the strips 8 may, after turning through an angle of 90°, be placed on the cement film and pressure then applied to the strips 8 to make sure that good contact between the fibres and the cement is achieved over the whole surface.

An essential feature of the invention illustrated in this example is the turning of the ceramic fibre strips 8 through 90° to obtain the end-on orientation of the fibres 9' relatively to supporting layers of the panel.

The modular panels shown in FIG. 1 are desirably heated to 60°C – 100°C to harden the cement and make the strips of ceramic fibres rigid thus fixing the desired orientation of the fibres. After this heat treatment, the modular units are ready for use in furnaces or oven constructions.

Other advantages arising from the use of ceramic fibre blanket in the way described in the example are that any available thickness and density of blanket can be used to obtain a wide range of thickness and density in the hot-face layer. Strips of the desired thickness are cut, then compressed to the desired density during the forming of the hot-face. This eliminates the formation of blanket "off-cuts," which otherwise would be waste material.

Turning now to FIGS. 6 to 9 the panel illustrated comprises a hot-face 11 made up of end-on ceramic fibre strips 12, a layer 13 of vermiculite block insulating material, a layer 14 of mineral wool and a steel plate 15 having channel shaped end parts 15' for supporting the panel in its working position. The layer 14 is impaled onto the plate 15 by heat resisting anchors 16. The heads 17 of anchors 16 are located in recesses 18 in layer 13 and are located therein by filling the recesses 18 with a cement made up of equal parts by weight of PB sillimanite grade CML 100 and plaster of paris made up to a smooth paste with water.

Figure 7:
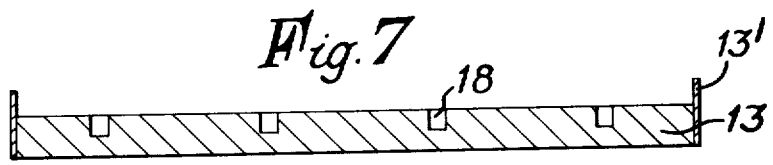
Figure 8:
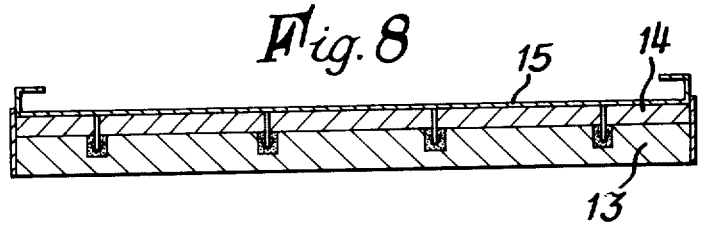
Figure 9:
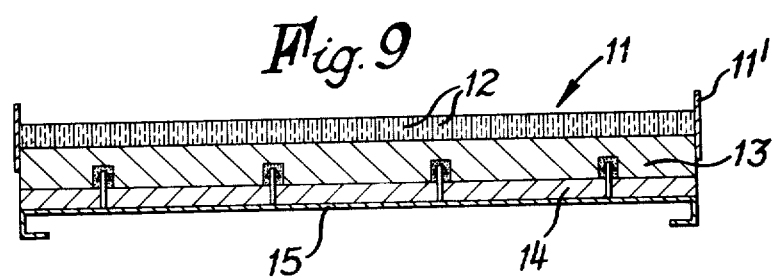

The assembly procedure is as follows:

The layer 13 is placed in the orientation shown in FIG. 7 between jig plates 13' and the recesses 18 filled with cement. The plate 15/panel 14 assembly of FIG. 6 is inverted and applied to the layer 13 as illustrated in FIG. 8. The plates 13' provide jig location. Evenly distributed weight is applied to the exterior of the plate 15 and the cement allowed to set. The jig plates 13' are then removed and the assembly turned over. The cement film (not shown) is then applied as previously described. The strips 12 are assembled on a base grid of wires extending between metal strips 11'. The grid carrying the strips 12 is then laid onto the cement coated assembly as shown in FIG. 9, the strips 11' serving as jigs. The strips 11' and supporting wires are then removed and the cement allowed to set securing the hot-face.

An unsupported laminate or "biscuit" panel is shown in FIGS. 10 and 11. Here a furnace casing panel comprises a hot-face 19 of short end-on strips and a layer 20 of vermiculite block (the cement film between hot-face 19 and layer 20 not being shown. This assembly is fixed to a backing steel plate 21 faced with mineral wool 22, anchors 16 and cement filled recesses 18 being used as described with reference to FIGS. 6 and 9.

We claim:

1. A method of manufacturing lining element modules for the hot-face surface of a furnace or oven which comprises:
   dividing into laterally extending strips a sheet of refractory fibrous material having fibers extending longitudinally parallel to the flat plane of the sheet,
   attaching the resulting strips to a support with the fibers in each strip positioned end-on to said support with an unhardened refractory cement,
   said support comprising:
     a layer of heat insulating block material,
     a backing metal sheet, and
     a further heat-insulating layer clamped between said metal sheet and said block material,
   and then heating the resulting assembly to harden said cement and fix the strips to said support with the fibers end-on to the support.

2. The method of claim 1 wherein said strips are supported in end-on position on a wire grid, the grid with the supported strips is placed onto said support and then the wires forming the grid are removed.

3. The method of claim 2 wherein said grid includes jigs for correctly positioning said strips relatively to said support.

* * * * *